Feb. 9, 1926.
R. C. HUBBARD ET AL
1,572,798
LIGHT CONTROL ATTACHMENT FOR FILM PRINTING MACHINES
Filed Sept. 1, 1923
5 Sheets-Sheet 4
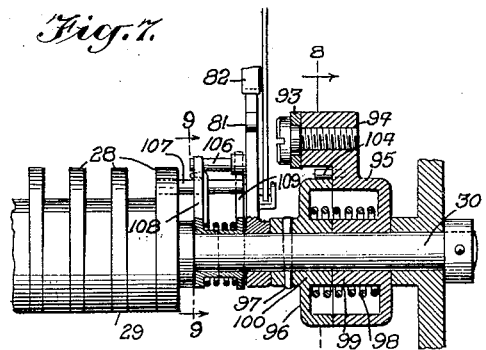
Fig. 7.
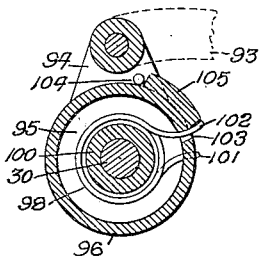
Fig. 8.
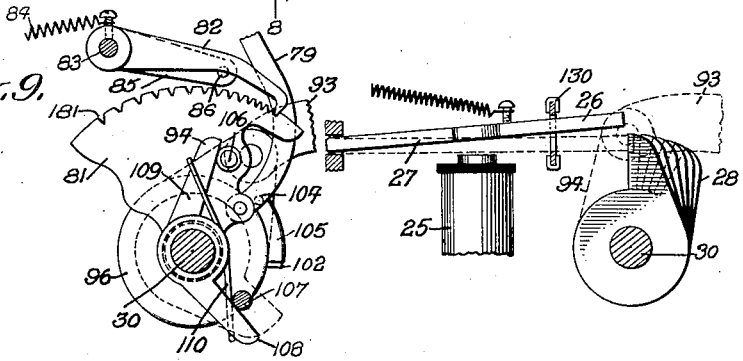
Fig. 9.
Fig. 10.
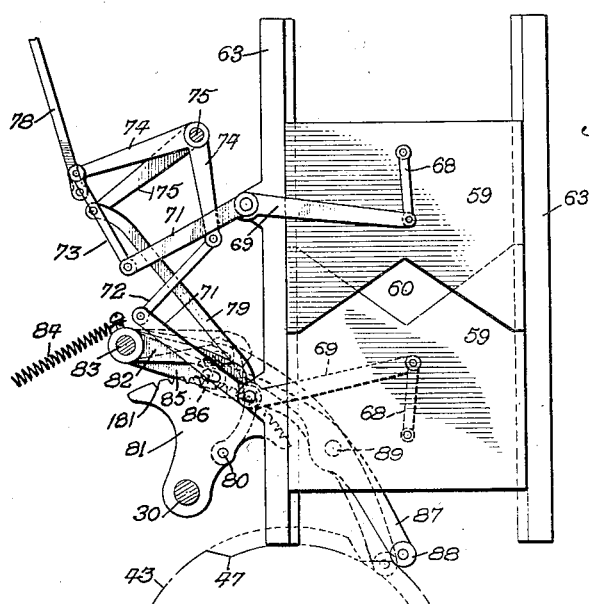
Fig. 11.
WITNESSES
INVENTORS
ROSCOE C. HUBBARD
AUGUST E. MUTSCHER
BY
ATTORNEYS Feb. 9, 1926.
R. C. HUBBARD ET AL
1,572,798
LIGHT CONTROL ATTACHMENT FOR FILM PRINTING MACHINES
Filed Sept. 1, 1923    5 Sheets-Sheet 5
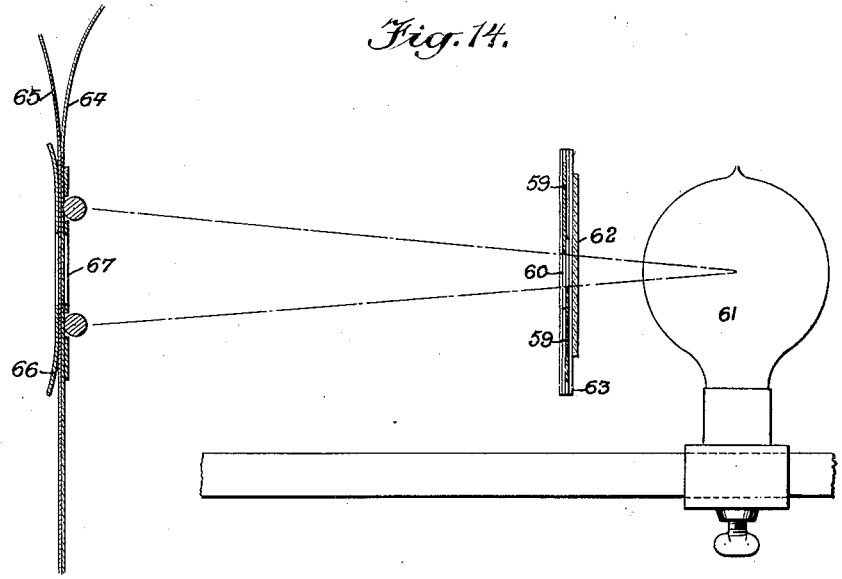
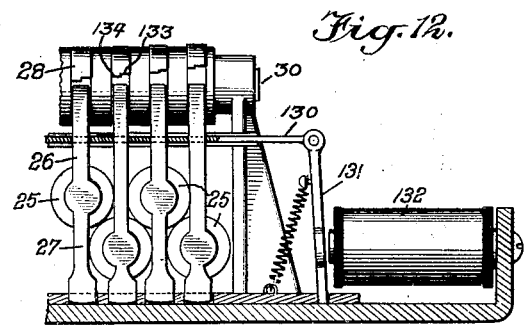
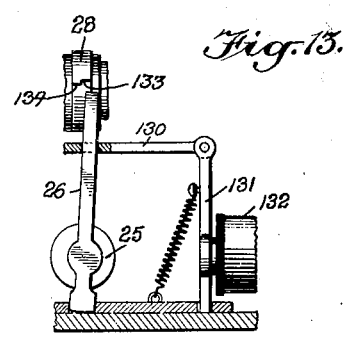
WITNESSES
INVENTORS
ROSCOE C. HUBBARD
AUGUST E. MUTSCHER
BY
ATTORNEYS Patented Feb. 9, 1926.

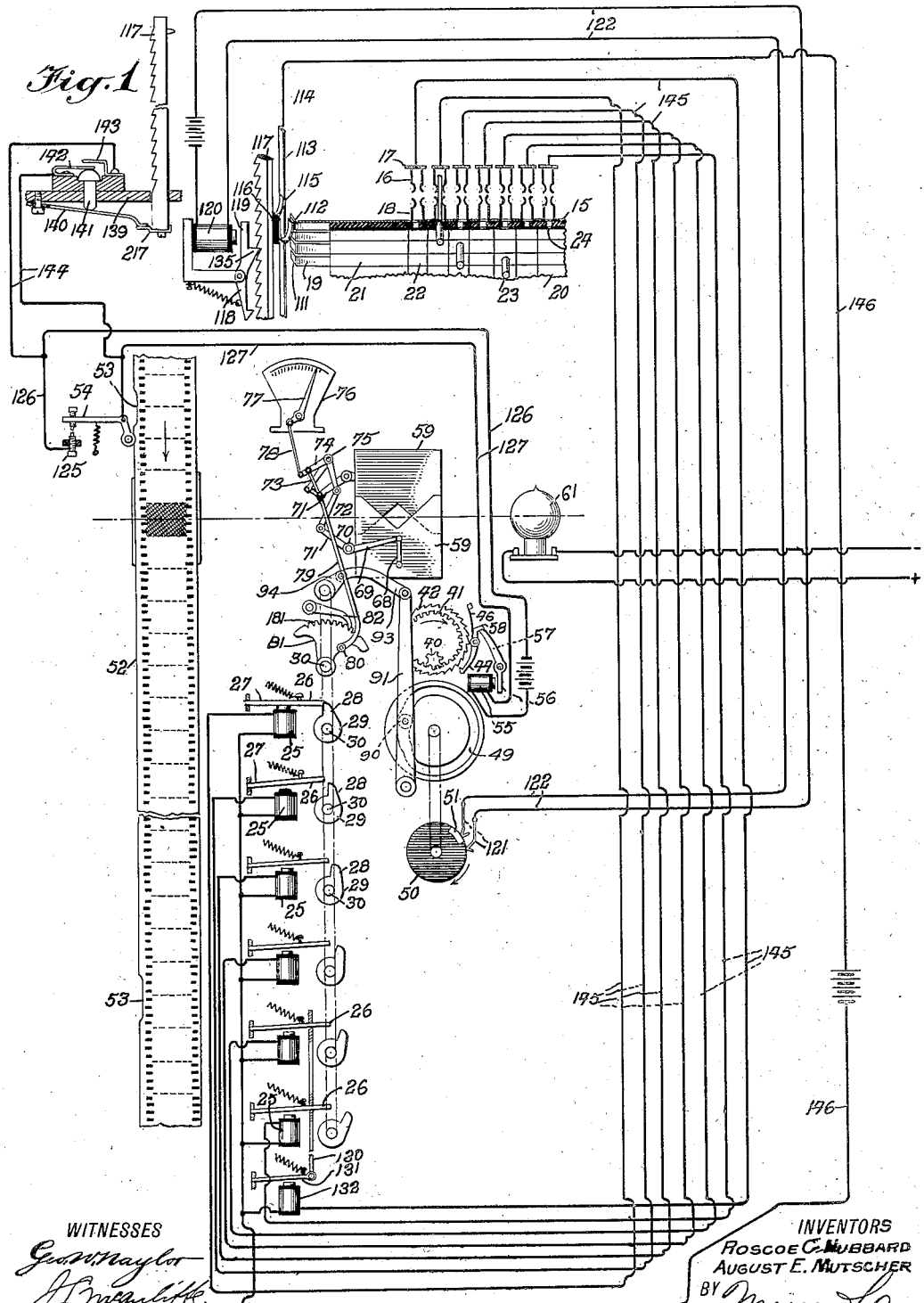

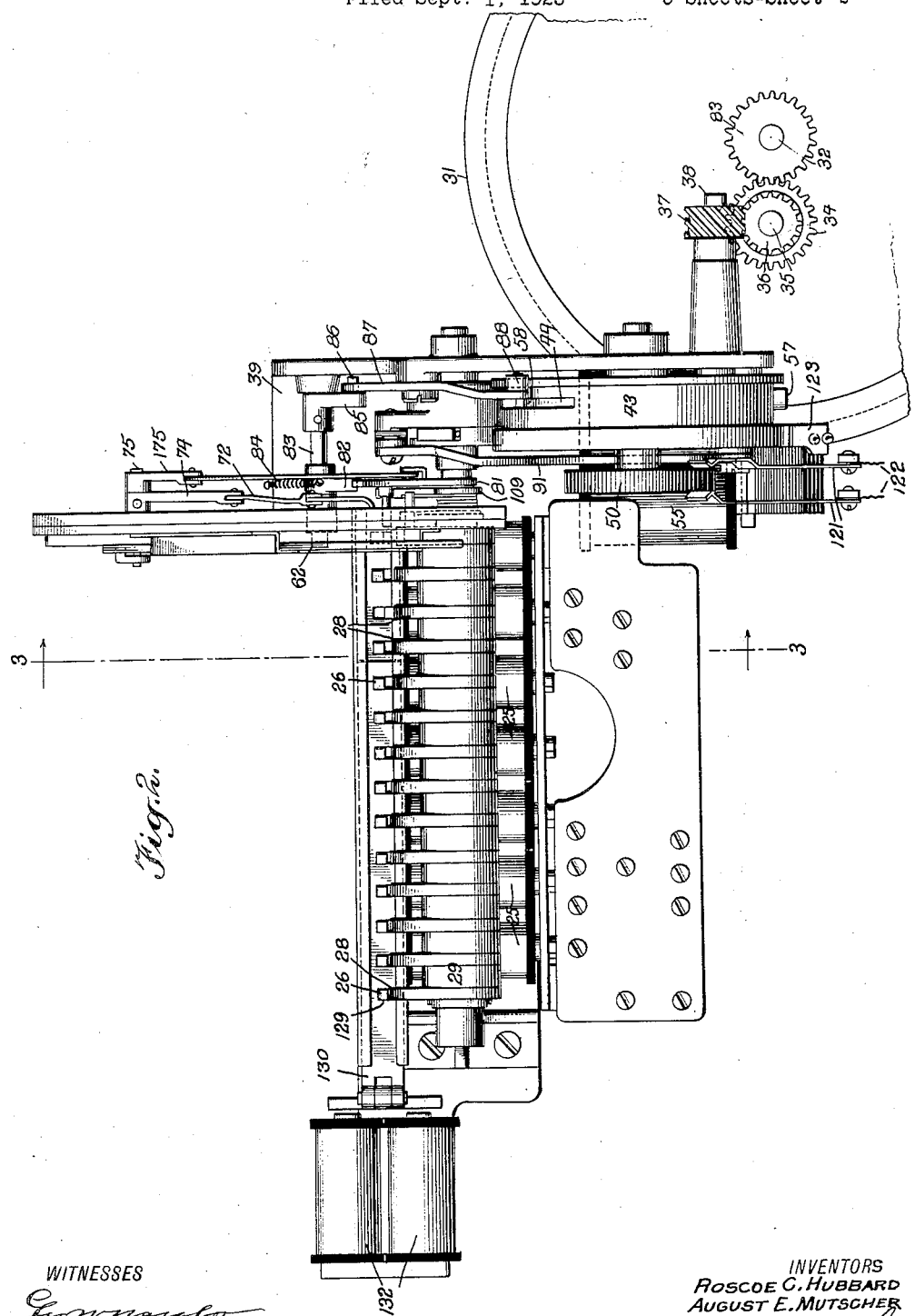

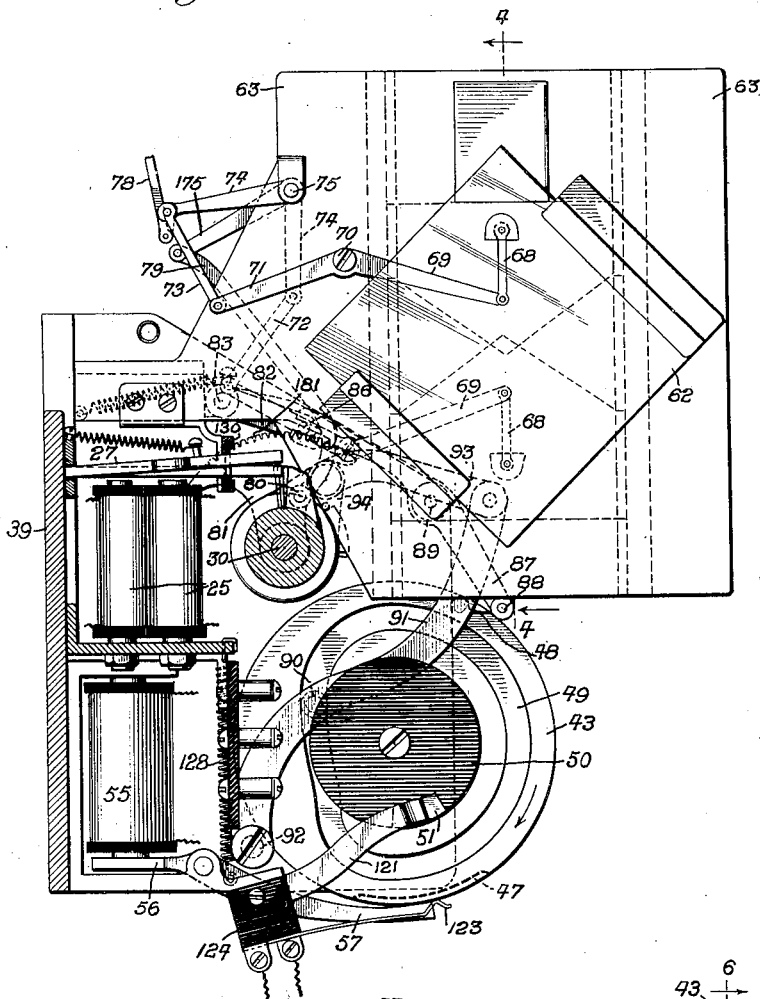

1,572,798

UNITED STATES PATENT OFFICE.

ROSCOE CONKLING HUBBARD, OF MOUNT VERNON, AND AUGUST E. MUTSCHER, OF SOUTH OZONE PARK, NEW YORK, ASSIGNORS TO ERBOGRAPH COMPANY, OF NEW YORK, N. Y., A CORPORATION OF NEW YORK.

LIGHT-CONTROL ATTACHMENT FOR FILM-PRINTING MACHINES.

Application filed September 1, 1923. Serial No. 660,583.

*To all whom it may concern:*

Be it known that we, ROSCOE CONKLING HUBBARD and AUGUST E. MUTSCHER, citizens of the United States, and residents, respectively, of Mount Vernon, county of Westchester, and State of New York, and South Ozone Park, borough of Queens, county of Queens, and State of New York, have invented a new and Improved Light-Control Attachment for Film-Printing Machines, of which the following is a description.

Our invention relates to a machine for printing motion picture films. In printing motion picture films it becomes necessary to automatically vary the light effect on the film at the different sections according to the density of the film at the various portions due to the different light conditions under which the exposure of a given portion or portions of the film was made. The usual practice in printing films is to vary the intensity of the light by varying the resistance through the medium of a rheostat, the light aperture of the diaphragm remaining constant.

The general object of our invention is to provide a film printing machine in which the intensity of the light may remain constant and in which the light effects on the film are varied by varying the light aperture in the diaphragm.

A further object of our invention is to provide a machine depending on variation of the light aperture and governed in its functioning by the film to actuate and control the diaphragm.

Our present invention furthermore has for an object to provide electromagnetic control means to actuate the diaphragm operating means.

More specifically, the invention has for an object to provide a structural embodiment of the invention reflecting practical considerations with respect to simplicity of construction, precision of operation, and facility of assemblage, adjustment and control.

The manner and means whereby the above and other objects are attained will clearly appear from the specific description of the illustrated means for carrying out the invention as hereinafter given.

Reference is to be had to the accompanying drawings forming a part of this specification, it being understood that the drawings are merely illustrative of one example of the invention.

Figure 1 is a schematic view of a light control attachment for film printing machines embodying our invention including circuits of electromagnetic responsive devices;

Figure 2 is a side elevation of the attachment;

Figure 3 is a transverse vertical section in a plane indicated by the line 3—3 of Figure 2;

Figure 4 is a vertical section on the line 4—4, Figure 3;

Figure 5 is a vertical section through a cam assemblage and its actuating means, to be hereinafter particularly referred to;

Figure 6 is a section through the cam in a plane at right angles to Figure 5 as indicated by the line 6—6, Figure 5;

Figure 7 is a fragmentary view partly in elevation and partly in longitudinal vertical section through the control shaft and parts pertaining thereto for actuating the diaphragm operating means;

Figure 8 is a transverse vertical section approximately on the line 8—8, Figure 7;

Figure 9 is a cross section on the line 9—9, Figure 7, certain parts in Fig. 9 being shown in different positions from those in Figure 7;

Figure 10 is a transverse vertical section through the control shaft and through the electromagnetically controlled stop means for selectively varying the rocking movement permitted the control shaft;

Figure 11 is a front elevation of the diaphragm, its operating means and the actuating means for said operating means;

Figure 12 is a fragmentary view partly in section and partly in elevation showing in association with a portion of the control shaft, electromagnetic means for fractionally varying the unit movement imparted to the diaphragm sections;

Figure 13 is a fragmentary view showing a portion of the elements of Figure 12 but with the parts in different positions.

Figure 14 is a view partly in side view and partly in vertical section and indicating relative positions of the light, light diaphragm, and travelling film.

In carrying out our invention in accordance with the illustrated example, a switch board 15 (see Figure 1) is employed equipped with a rear row of spring contacts 16 on vertical bars 17 as well as on opposed row of spring contacts 18 on horizontal bars 19. The contacts 18 aline each with a contact 16 to form a pair to be bridged for closing the circuit as will appear. In practice a master card 20 is employed to be applied to the face of the switch board 15, said card being known as employed in connection with the rheostats of the known machines which vary the resistance in the circuit and therefore the card needs no further explanation. Suffice it to say that it is lined vertically and horizontally to provide spaces 21 for the title or identifying designation of the particular section of the film and quadrangles 22 in horizontal and vertical rows, said quadrangles in practice bearing numerals in arithmetical sequence in horizontal rows. Each horizontal row of quadrangles 22 bears the numerals in succession, 1 to 15, usually, the numbers being omitted here in the interest of clearness. Each quadrangle 22 is adapted to be punched to receive a switch plug 23 in any quadrangle numbered 1 to 15 according to the light effect required for a given section of the film.

The plugs 23 pass through apertures 24 in the switch board 15 and therefore through the opposed pairs of spring contacts 16, 18 for bridging said contacts, for closing the circuit at a point corresponding with a particular quadrangle of the card 20, whereby the circuit is closed selectively through one of a series of magnets 25 corresponding in number and order with the quadrangles 22. The terminal 26 of the armature 27 of each magnet 25 constitutes a stop finger adapted to engage an arm 28 on stop disks 29 of a control shaft 30. Said shaft 30, disks 29, arms 28, stop fingers 26, armatures 27 and the magnets 25 constitute a control device for the actuating mechanism of the diaphragm operating means as will appear. The arms 28 on the control shaft 30 are stepped, said arms being stepped back one from another so that they are disposed essentially on a spiral line about the shaft 30 and rigid therewith, the purpose being to variously arrest the rocking movement of the control shaft to give varying movement to the diaphragm sections as hereinafter explained.

The shaft 30 (see Figure 2) is driven from a drive element 31 on the shaft 32 of which is a drive pinion 33 meshing with a pinion 34 on a counter shaft 35. On the shaft 35 is fixed a spiral pinion 36 meshing with a pinion 37 keyed to a stud shaft 38 on the frame designated generally by the numeral 39. The pinion 37 serves to continuously turn the stud shaft 38.

Turning with the stud shaft 38 is a pinion 40, (see Figures 5 and 6) meshing with an internal ring gear 41 having rigid therewith a ratchet wheel 42. Loosely embracing the ring gear 41 and its ratchet wheel 42 is a master cam designated generally by the numeral 43. Means is provided to clutch the cam to the ratchet wheel 42 for which purpose use is made in the illustrated example of a gripping pawl 44 pivoted as at 45 on the cam 43 and acted upon by a spring 46 tending to throw said pawl 44 into clutch with the ratchet wheel 42, whereby the turning of the ratchet wheel will carry with it the pawl 44 and thereby turn the cam 43 in unison with the ratchet wheel and with the ring gear 41 and stud shaft 38. Cam 43 has a depression 47 in its periphery at one side and at the opposite side or face a peripheral notch 48. Said opposite face also has a cam groove 49. Rigid with the cam 43 to turn therewith is an insulating disk 50 provided with a bridge piece 51.

The clutching in of the cam 43 with the driven ring gear 41 is brought about through the medium of the film 52 which is provided with notches 53 at spaced intervals in a side edge thereof. Bearing against the film 52 at the notched side edge is a circuit closing arm 54 in circuit with a magnet 55 so that when a notch 53 comes opposite the arms 54 the magnet 55 will be energized. The armature 56 of magnet 55 has a latch arm 57 adapted to engage the arm 58 on the clutch dog 44 in a manner to hold the dog out of engagement with the ratchet wheel 42. With the magnet 55 energized the latch 57 will release the dog 44 and permit its spring 46 to throw the dog into engagement with the ratchet 42, thereby clutching the driven wheel 41 with the cam 43, whereby said cam will be constrained to turn with said wheel 41 and ratchet wheel 42.

Diaphragm sections 59 form a variable light aperture 60 through which light from a lamp 61 (of unvarying intensity) may pass after passing through a ground glass backing 62. The diaphragm sections move in side guides 63. The negative film 64 and the sensitive film 65 imposed thereon pass in the usual manner through a guide 66 having a light aperture 67 in line with the aperture 60 in the diaphragm.

The illustrated operating means for the diaphragm sections is as follows: A link 68 is pivoted at one end to each diaphragm section and each of said links is pivoted at its other end to one arm of a lever 69 fulcrumed between its ends as at 70. The other arm 71 of the levers 69 connect by links 72, 73 with arms 74 constituting essentially a bell-crank lever fixed to a rock shaft 75. An indicator 76, Figure 1, includes a pointer 77 connected up by a link 78 with one of the arms 74 so that as the diaphragm is operated the position thereof will be indicated by the indicator 76. The shutter operating mechanism is actuated as follows: A link 79 extends from an arm 175 on shaft 75 to a connection at 80 with a sector 81 having notches 181 corresponding with the number of pairs of opposed contacts 16, 18 and therefore corresponding with the number of quadrangles 22 in the horizontal rows of the card 20. The sector 81 is loose on the controller shaft 30 and is adapted to be engaged by a pawl 82 fixed to a rock shaft 83 which tends to be turned in one direction by a spring 84 for lifting the pawl out of engagement with said sector. Rigid with the shaft 83 also is a second arm 85 which has connection by a lateral pin 86 with the forked end of lever 87 carrying a roller 88 riding on the cam 43 and adapted to move radially inward into the depression 47, said lever 87 being fulcrumed between its ends as at 89.

Travelling in the cam groove 49 of cam 43 is a roller 90 (see Figures 7 and 8) on a lever 91 fulcrumed at one end as at 92. The opposite end of the lever 92 connects by a link 93 with an arm 94 on a housing section 95 loose on the shaft 30. The mating section 96 of the housing is fixed as by a pin 97 or the like to shaft 30. A spring 98 is coiled about hubs 99, 100 on the housing sections 95, 96 within said housings. One end 101 of the spring 98 passes radially into the loose housing 95 and is thereby fixed. The opposite end 102 of spring 98 passes through a radial hole 103 in the fixed housing section 96, the spring thereby establishing a yielding connection between the housing sections 95, 96. On the arm 94 of housing section 95 is a lateral pin 104 adapted to engage against one end of a protuberance 105 on fixed housing section 96. The spring terminal 102 bears against the fixed section 96 at the opposite end of the protuberance 105. On a face of the sector 81 is a lateral pin 106. A second lateral pin 107 extends from the end arm 28 and projects in the opposite direction from the pin 106 on the sector 81. Two arms 108 and 109 have hubs loosely sleeved on the shaft 30, the one arm 109 being adjacent to the sector 81. A spring 110 is coiled about the hubs of the arms 108, 109 and the terminals of said spring bear at the backs of the respective arms, and by reason of the spring arms bearing against the pins 106, 107 the tension of the spring will tend to bring the arms 108, 109 to positions which will cause the pins 106, 107 to be carried into radial alinement. The arms 108, 109 in moving under the pins 106, 107 in response to the pressure of the spring 110, will cause a relative movement of sector 81 about the axis of the shaft 30 since the pin 107 is rigid with the shaft 30 by being rigid with the arm 28 of disk 29 while the pin 106 is rigid with the sector 81.

The operation for the movement of the diaphragm sections is brough about as follows: It is to be noted that the setting of a stop finger 26 in the path of an arm 28 by the action of a magnet 25 is effected before a notch 53 arrives at the circuit closing arm 54 so that the setting will be done in advance of a change in the size of the diaphragm aperture, that is to say, the sector 81 when engaged by the pawl 82 holds the diaphragm in a given adjustment while a finger 26 is being positioned by a magnet 25 for the next adjustment, that is to say, the notch 53 is so located that the latch 57 will be withdrawn to release the dog 44 while the machine is operating at the previous adjustment of the diaphragm.

The feed at the switch board is as follows: The circuit is closed successively through the horizontal bars 19 representing each a horizontal row of quadrangles 22 on the card 20 and a plug 23 therein. At one end of the bars 19 each is formed with a bent end 111 adapted to be engaged by a brush contact 112, in electrical connection with a second brush 115 adapted to wipe over a strip 113 in electrical connection with the main feed 114. The contacts 112, 115 are on an insulating block 116 on the feed ratchet bar 117. The ratchet bar 117 is adapted to be engaged by a pawl 118 on the armature 119 of a magnet 120. The cam 43 controls the circuit in which is the magnet 120. This is done through the medium of the insulated disk 50 and its bridge piece 51. Said bridge piece is adapted to bridge the gap between resilient terminal brushes 121 connected by conductors 122 in circuit with the magnet 120.

The notch 48 in the cam 43 is adapted to receive a spring latch 123 (see Figure 3) to hold the cam against turning with the turning of the ring gear 41 with the continuously driven shaft 38. Said spring 123 is here shown as fastened to a block 124 on the frame 39. In operation the continuously driven shaft 38 (see Figure 5) continuously drives the ring gear 41 and its integral ratchet wheel 42. The cam 43, however, is held against turning by engagement of the latch spring 123 in the notch 48, the dog 44 at this time being held out of engagement with ratchet 42 by the latch 57 engaging the lug 58 on said dog. As soon as the notch 53 in the film 52 arrives at the circuit-closing arm 54, the circuit will be closed as follows: Arm 54 will engage a contact 125 from which the current passes by wire 126 to magnet 55 and returns from said magnet by wire 127 to the arm 54. The energizing of magnet 55 will attract armature 56 and cause the latch 57 to disengage lug 58 and release the dog 44 of cam 43, thereby permitting the spring 46 to throw said dog into clutch with the ratchet wheel 52, thus clutching the cam 53 to the driven ring gear 41. The cam 43 will now turn with the ring 41 and will make one complete revolution before again being released. In the turning of cam 43 the lever 91 will be given an oscillation back and forth or through one complete stroke by reason of the roller 90 on said lever travelling in the cam groove 49. The oscillation of lever 91 will through the link 93 and arm 94 give rocking movement to the housing section 95 loose on shaft 30. The pin 109 (see Figure 9) carried by said housing section 95 will engage the lug 105 on fixed housing section 96 and thereby will turn the shaft 30 and stress the spring 98. The turning of shaft 30 will turn the disks 29 and hence the arms 28 on said disks. That arm 28 carrying the pin 107 will cause said pin to be turned through an arc. The movement of the pin 107 will carry the arm 108 through an arc about the axis of the shaft 30 and turn said shaft and stress the spring 110. In the meantime the arm 109 bears against the pin 106 on sector 101 but said sector at this time is locked by pawl 82 and cannot turn. In the continued turning of cam 43 the depression 47 thereof will arrive at the roller 88 of lever 87, which will permit the spring 84 to rock the shaft 83. The rocking of the shaft 83 is permitted by reason of the connection of the forked end of the lever 87 with the arm 85 through the pin 86. The rocking of shaft 83 by the spring 84 will lift the pawl 82 out of engagement with the sector 81 leaving said sector free to turn about the axis of the shaft 30 under the reaction of the spring 110, said spring acting through arm 109 and pin 106 to rock the sector.

The rocking of sector 81 will actuate the described means for operating the diaphragm sections 59 as follows: The link 79 pivoted at 80 to the sector 81 connects at its opposite end with arm 175 on shaft 75 and will rock said shaft and thereby rock the bellcrank lever 74 and through the links 72, 73 will rock the levers 69 which through links 68 will move the diaphragm sections 59 toward or from each other through a given unit adjustment depending on which of the notches 181 was engaged by the pawl 82, the position of the pawl in a particular notch 181 determining as will be obvious the throw that will be given the sector 81 in the reaction of the spring 110 acting through arm 109 and pin 106.

The movement of the lever 91 is uniform at all times but its action on the shaft 30 varies, the movement depending on which arm 28 is arrested by stop finger 26 of an armature 27. Thus, the spring 98 (see Figure 7) permits the link 93 to have the full movement imparted to it by the lever 91 while the shaft 30 is held back by engagement of a stop finger 26 with an arm 28. In the revolution of the cam 43 as soon as the roller 88 leaves the depression 47 the movement will rock the lever 87 in a direction to cause said lever through pin 86 and arm 85 to rock the shaft 83 against the tension of the spring 84 and thereby throw the pawl 82 into the particular notch 181 of the sector 81 determined by the movement imparted to the shaft 30 which movement of shaft 30 is determined as will be clear by the particular stop finger 26 engaging an arm 28.

The magnet 55 only momentarily controls the latch 57, that is to say, while the circuit closing arm 54 is at a notch 53 after which the control of the magnet 55 over the latch 57 ends. A spring 128 (Figure 3) is provided connected with the latch 57 and tending to throw said latch inwardly or into latching position. Said latch 57 rides on the periphery of the cam 43 until the lug 58 on dog 44 arrives at said latch 57 whereupon the latch trips the lug 58 and throws the dog 44 out of clutch with the ratchet wheel 42 thereby releasing the connection between the driven ring gear 41 and the cam 43. In order to prevent the cam from turning after disengagement of the dog 44, the latch 123 will enter the notch 48, the arrangement being such that said notch 48 will arrive at the latch 123 at the time the dog 44 is thrown out. It will be seen that the unit adjustment of the diaphragm sections 59 is governed by the position of pawl 82 in a particular notch 181 on sector 81 and that the engagement of said pawl with a particular notch is determined by the particular stop finger 26 thrown into the path of a selected arm 28. We provide means for fractionally varying the unit adjustment of the diaphragm. Thus, arms 28 relating to the minimum adjustments need no fractional variation because of the smallness of the light aperture 60, but those arms 28 and their stop fingers 26 that control the larger adjustments of the diaphragm sections may be fractionally varied as follows: The fingers 26 (Figures 1 and 2), pass through slots 129 in a flat bar 130 pivotally connected with the armature 131 of a magnet 132. The magnet 132 is controlled by a switch plug 23 inserted in the switch board at those alined contact springs 16, 18 pertaining to Number 1 on the card 20, that is to say, the minimum adjustment. The first adjustment or Number 1 is manually set as will appear and needs no plug 23. Hence we utilize the aperture 24 at the first contact 16, 18 of the switch board to control the magnet 132. Thus, when a fraction of the unit adjustment of the light aperture 60 is to be made a plug 23 is inserted in the first hole 24 at the left of Figure 1 in a given horizontal row of quadrangles 22; the plug inserted in the first quadrangle will be in addition to that plug 23 closing the circuit for a magnet 25 in a given row of quadrangles 22. Hence the circuit when closed through a horizontal bar 19 by the brush contacts 112, 115 will close also the circuit through the magnet 132 and draw the armature 131 thereof, thereby sliding the flat bar 130 through which certain stop fingers 26 pass. The movement imparted to the bar 130 is very slight so that there is a slight shifting of the finger 26.

Referring to Figures 12 and 13, it will be seen that the arms 28 shown therein have their end surfaces in two planes, each end having a notch 133. The action of the bar 130 under the influence of the magnet 132 will be such as to swing the finger 26 in its own plane through a sufficient arc to engage in the notch 133, thereby permitting a slight additional movement of the arm 28 as compared with the normal position of the finger 26 for engagement with the greater projection 134 on the arm 28.

Reverting to the feed devices for automatically effecting the electrical connection of the switch bar, the ratchet bar 117 is permitted to gravitate step by step through the medium of an escapement formed integrally with the armature 119 and pawl 118, the said armature having a tooth 135 coacting with the tooth or hook of the pawl 118 to constitute an escapement operating at each energizing of the magnet 119 by the turning of the disk 50 and its brush contact 51.

The restoring of the ratchet bar 117 in resetting the switch board is brought about manually. The bar 117 (see the upper left hand corner of Figure 1, where said bar is shown for the second time in a schematic form) passes through a part 139 of the frame 39. Said ratchet bar 117 has a foot 217 adapted to be raised with the raising of said bar 117 to initial position to cause said foot 217 to lie adjacent to a spring 140. Resting on the spring 140 is a contact pin 141, the head of which is beneath a spring contact 142 adapted to engage a second contact 143, whenever the pin 141 is moved upwardly.

In resetting the machine the bar 117 is moved to its upper position or until its foot 217 lies adjacent to the end of the spring 140. Now when it is desired to start the machine the bar 117 is raised still further to cause its foot 217 to flex the spring 140 upwardly, thereby raising the pin 141 and closing the circuit between the contacts 142, 143. This closes a shunt circuit through wires 144 to thereby close the circuit through the conductors 127 and the magnet 55 controlling the cam latch 57. Hence, the closing of the circuit at the contacts 142, 143 will energize the magnet 55 and cause the cam 43 to be thrown into clutch with the driven ring gear 41 for starting the machine.

The brushes 112, 115 carried by the bar 117 will now close the circuit through successive bars 19 as the bar 117 is fed downwardly step by step through the escapement represented by the armature 119 and pawl 118.

The numeral 145 indicates the conductor wires from the vertical strips 17 of the switch 15 to the respective magnets 25 and 146 indicates the conductor wire returning to the main feed wire 114 and strip 113.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. In a film printing machine functioning through the medium of a travelling film, means to produce a variable light aperture, means to bring about various predetermined unit adjustments of the first means, and selective means optionally operable to determine the unit adjustments; together with means to fractionally modify the extent of the selected unit adjustment.

2. In a film printing machine functioning through the medium of a travelling film, means to produce a variable light aperture, means to operate the first means and optionally effect any one of a multiplicity of different predetermined adjustments of the first means, turnable means controlling the second means, a revoluble cam to cause the controlling means to function, electromagnetically controlled means to turn said cam, and selective stop means optionally operable to determine the extent of movement of said turnable controlling means and thereby determine the unit adjustment of said first means.

3. In a film printing machine functioning through the medium of a travelling film, means to produce a light aperture, means to operate the first means and optionally effect any one of a multiplicity of different predetermined adjustments of the first means, a turnable means controlling the second means, a revoluble cam to cause said controlling means to function, means to drive said cam, a switch comprising a multiplicity of selective circuit-closing elements, an electromagnetic responsive device controlling said cam driving means, to throw the cam into or out of driven relation to said drive means, and selective stop means optionally operable to determine the extent of movement of said turnable controlling means and thereby determine the unit adjustment of the first means.

4. In a film printing machine functioning through the medium of a travelling film, means to produce a light aperture, means to operate the first means and optionally effect any one of a multiplicity of different predetermined adjustments of the first means, a turnable means controlling the second means, a revoluble cam to cause said controlling means to function, means to drive said cam, a switch comprising a multiplicity of selective circuit-closing elements, an electromagnetic responsive device controlling said cam driving means to throw the cam into or out of driven relation to said drive means, said controlling means comprising a multiplicity of members out of line with each other, and a series of magnets corresponding in number with said members on the turnable controlling means, said magnets having armatures constituting stops to engage said members on the controlling means, the circuits of said plurality of magnets being dependent on the said selective circuit-closing elements on the switch.

5. In a film printing machine functioning through the medium of a travelling film, means to produce a light aperture, means to operate the first means and optionally effect any one of a multiplicity of different predetermined adjustments of the first means, a turnable means controlling the second means, a revoluble cam to cause said controlling means to function, means to drive said cam, a switch comprising a multiplicity of selective circuit-closing elements, an electromagnetic responsive device controlling said cam driving means, to throw the cam into or out of driven relation to said drive means, said controlling means comprising a multiplicity of members out of line with each other, and a series of magnets corresponding in number with said members on the turnable controlling means, said magnets having armatures constituting stops to engage said members on the controlling means, the circuits of said plurality of magnets being dependent on the said selective circuit-closing elements on the switch; together with means to fractionally modify the engagement of said armatures with said members of the controlling means to thereby vary the unit adjustments of the first means.

6. In a film printing machine, a diaphragm having a single light aperture and adjustable to effect various unit enlargements or reductions of its light aperture, means to operate said diaphragm, means to cause the first means to functionate, said second mentioned means including a multiplicity of separate elements each selectively adapted to bring the second means into action, and step-by-step feed means to cause said separate means to functionate in succession.

7. In a film printing machine adapted to print through the medium of a travelling film, a diaphragm adjustable to effect various unit adjustments of its light aperture, means to operate said diaphragm, means to cause the first means to functionate, said second mentioned means including a multiplicity of separate elements each selectively adapted to bring the second means into action, and film-controlled step-by-step feed means to bring said separate elements into action in succession.

8. In a film printing machine adapted to print through the medium of a travelling film, a diaphragm variable to vary its light aperture, and means to effect various adjustments of the diaphragm for thus varying its light aperture, said means comprising the following: diaphragm operating means, actuating means for said operating means, controlling means to variably regulate said actuating means, means including an electromagnetic responsive device to which said controlling means is subject for bringing it into action, a series of stop members to determine the extent of movement of said controlling means to thereby determine the amplitude of movement of said operating means, a series of selective magnets to individually operate said stop devices, a series of optionally placeable switch devices to energize a predetermined magnet, and film-controlled means to cause said placeable switch elements into function in succession.

9. In a film printing machine adapted to print through the medium of a travelling film: a diaphragm adjustable to effect various adjustments of its light aperture, means to operate said diaphragm to effect a given adjustment, means to cause the first mentioned means to function, turnable controlling means for said second means, said controlling means including a multiplicity of members differently positioned to determine the extent of movement of the controlling means, a multiplicity of stop elements adapted to respectively engage respective members of the controlling means, electromagnetic devices to selectively operate said stop members, and a switch including a multiplicity of optionally placeable switch elements to selectively close the circuits of said electromagnetic devices.

10. In a film printing machine adapted to print through the medium of a travelling film: a diaphragm adjustable to effect various adjustments of its light aperture, means to operate said diaphragm to effect a given adjustment, means to cause the first mentioned means to function, turnable controlling means for said second means, said controlling means including a multiplicity of members differently positioned to determine the extent of movement of the controlling means, a multiplicity of stop elements adapted to respectively engage respective members of the controlling means, electromagnetic devices to selectively operate said stop members, and a switch including a multiplicity of optionally placeable switch elements to selectively close the circuits of said electromagnetic devices; together with a step-by-step current feed means associated with said switch to cause the placed switch elements to function in succession in completing a circuit; a continuously operating drive element, an electromagnetic device to actuate said feed means, revoluble circuit-closing means adapted to be driven by said drive element and operable to energize said last-mentioned magnet, and film-controlled means to establish drive connection between said drive element and said revoluble circuit-closing means.

11. In a film printing machine adapted to print through the medium of a travelling film: a diaphragm adjustable to effect various adjustments of its light aperture, means to operate said diaphragm to effect a given adjustment, means to cause the first mentioned means to function, turnable controlling means for said second means, said controlling means including a multiplicity of members differently positioned to determine the extent of movement of the controlling means, a multiplicity of stop elements adapted to respectively engage respective members of the controlling means, electromagnetic devices to selectively operate said stop members, and a switch including a multiplicity of optionally placeable switch elements to selectively close the circuits of said electromagnetic devices; together with a ratchet bar, contact elements to establish a circuit through said switch at a selected placeable element, an escapement for said ratchet bar, a magnet controlling said escapement, a continuously operating drive element, a rotatory circuit closer adapted to be driven by said drive element and operable to complete a circuit with the magnet controlling the escapement, and film-controlled means to establish drive connection between said drive element and said rotatory circuit-closing means.

12. In a film printing machine adapted to print through the medium of a travelling film: a diaphragm having a single light aperture and adjustable to vary its said single light aperture, and means operable to effect varying enlargements or reductions in the size of said light aperture, said means including control means to determine the degree of adjustment of the diaphragm; together with a drive element, means to continuously operate said drive element, and film-controlled means to throw said drive element into driving connection with said first means.

13. In a film printing machine adapted to print through the medium of a travelling film, a diaphragm, means to adjust said diaphragm for varying its light aperture, actuating means for said operating means, control means for said actuating means, said control means including a rock shaft, a series of arms along said shaft and set one rearward of the other in approximately a spiral line, a notched sector loose on said shaft, a spring-pressed element loose on said shaft, means yieldingly connecting said element with the shaft, means to rock said element, a pair of arms loose on the shaft, a pin on the sector adapted to be engaged by one arm of the pair, a pin on one of the series of arms and adapted to engage the other arm of the pair, a spring opposing the movements of the pairs of arms by a pin and tending to restore the arms after movement by the pins, a series of stop elements each adapted to engage one of the series of arms on the rock shaft, and film-controlled means adapted to selectively bring the stop elements into operative position.

14. In a film printing machine adapted to print through the medium of a travelling film: a diaphragm, means to operate said diaphragm to adjust the same for varying its light aperture, actuating means for said operating means, control means for said actuating means, film-controlled governing means for said controlling means, a continuously turning drive element, a cam normally out of drive connection with said drive element, a clutch dog adapted to effect driving connection between the cam and drive element, a trip latch to throw said dog out of action, an electromagnetic device adapted to be energized by said film-controlled governing means to disengage said latch from said dog, a lever actuated by the cam, and means operative by said lever to cause said control means to function.

15. In a film printing machine, a diaphragm formed of sections adjustable to vary the light aperture presented thereby, levers connected with the respective diaphragm sections, a rock shaft, arms on said rock shaft connections between the respective arms of the rock shaft and said levers, actuating means to give a rocking movement to said shaft, and control means for said actuating means; together with governing means for said control means to determine the extent of movement thereof to effect a given adjustment of the diaphragm sections, said governor means subject to the travelling film.

16. In a film printing machine adapted to print through the medium of a travelling film, a diaphragm adapted to effect various unit adjustments of its light aperture, means to operate said diaphragm, means, including a rock shaft, adapted to effect and control the operation of said first means, said second means including a switch having a series of vertical bars and a series of horizontal bars each having related contacts, plugs adapted to close the circuits through the contacts of the respective bars, a terminal strip adapted to be connected with a conductor, brush contacts adapted respectively to wipe over said terminal strip and over said horizontal bars in succession, a feed bar carrying said brush contacts, an escapement for feeding said bar to cause that brush contact engaging the horizontal bars to wipe over the bars in succession, drive means, means controlled by the film to establish driving connection between the drive means and the rockable element of the control means to cause the control means to function, and film-controlled means for establishing said drive connection.

17. In a film printing machine adapted to print through the medium of a travelling film, a diaphragm adapted to effect various unit adjustments of its light aperture, means to operate said diaphragm, means, including a rock shaft, adapted to effect and control the operation of said first means, said second means including a switch having a series of vertical bars and a series of horizontal bars each having related contacts, plugs adapted to close the circuits through the contacts of the respective bars, a terminal strip adapted to be connected with a conductor, brush contacts adapted respectively to wipe over said terminal strip and over said horizontal bars in succession, a feed bar carrying said brush contacts, an escapement for feeding said bar to cause that brush contact engaging the horizontal bars to wipe over the bars in succession, drive means, means controlled by the film to establish driving connection between the drive means and the rock shaft of the control means to cause the control means to function, and film-controlled means for establishing said drive connections; said feed bar being manually movable to restore the same to initial position, a circuit-closing device adapted to be controlled by the vertical movement of said feed bar, and means whereby said circuit controlling device will actuate the means to establish driving connection with the drive means.

18. In a film printing machine, a diaphragm having a single light aperture and adjustable to enlarge or decrease the size of said light aperture, means to bring about adjustment of the diaphragm, stop means to variously limit the movement of the first means to vary the unit adjustment of the diaphragm by the first means, control means to determine the position of said stop means, actuating means for said controlling means, and drive means for the actuating means.

19. In a film printing machine, a diaphragm having a single light aperture and adjustable to enlarge or decrease the size of said light aperture, means movable to bring about adjustment of the diaphragm, stop means to variously limit the movement of the first means to vary the unit adjustment of the diaphragm by the first means, control means to determine the position of said stop means, actuating means for said controlling means, and drive means for the actuating means.

20. In a film printing machine, a diaphragm adjustable to vary its light aperture, means movable to bring about adjustment of the diaphragm, a spring to cause movement of the first means, means to stress said spring, and stop means variously positioned with the stressing of said spring to variously arrest the movement of the first means for determining the unit adjustment of the diaphragm.

21. In a film printing machine, a diaphragm having a single light aperture and adjustable to enlarge or decrease the size of said light aperture, means movable to effect adjustment of the diaphragm, means to variously arrest the first means to vary the adjustment of the diaphragm, and means operable after the adjustment of the diaphragm to set said stop means for a subsequent operation of the first means.

ROSCOE CONKLING HUBBARD.
AUGUST E. MUTSCHER.